(12) United States Patent
Yang et al.

(10) Patent No.: US 12,035,415 B2
(45) Date of Patent: Jul. 9, 2024

(54) INFORMATION SHARING METHOD AND USER EQUIPMENT

(71) Applicant: VIVO MOBILE COMMUNICATION CO., LTD., Guangdong (CN)

(72) Inventors: Xiaodong Yang, Dongguan (CN); Fei Qin, Dongguan (CN); Wei Bao, Dongguan (CN); Fei Yang, Dongguan (CN); Feng Zhu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 398 days.

(21) Appl. No.: 17/377,081

(22) Filed: Jul. 15, 2021

(65) Prior Publication Data
US 2021/0345091 A1    Nov. 4, 2021

Related U.S. Application Data

(63) Continuation of application No. PCT/CN2020/071826, filed on Jan. 13, 2020.

(30) Foreign Application Priority Data

Jan. 18, 2019 (CN) .......................... 201910056818.8

(51) Int. Cl.
*H04W 8/20* (2009.01)
*H04W 36/08* (2009.01)
(Continued)

(52) U.S. Cl.
CPC ............. *H04W 8/20* (2013.01); *H04W 36/08* (2013.01); *H04W 48/08* (2013.01); *H04W 84/042* (2013.01)

(58) Field of Classification Search
CPC ....... H04W 8/20; H04W 36/08; H04W 48/08; H04W 84/042
See application file for complete search history.

(56) References Cited

U.S. PATENT DOCUMENTS 9,730,149 B2    8/2017 Feng et al.
9,853,777 B2    12/2017 Sharma et al.
(Continued)

FOREIGN PATENT DOCUMENTS

CN    101184290 A    5/2008
CN    101895969 A    11/2010
(Continued)

OTHER PUBLICATIONS

Supplementary European Search Report regarding Patent Application No. 20742080.3-1212/391404; PCT/CN2020/071826, dated Mar. 2, 2022.
(Continued)

*Primary Examiner* — Mewale A Ambaye
(74) *Attorney, Agent, or Firm* — Harness, Dickey & Pierce, P.L.C.

(57) ABSTRACT

An information sharing method includes: obtaining first information by using a first SIM card, the first information being information sent by a network device of a second SIM card and received by the second SIM card; and controlling the first SIM card according to the first information. The first SIM card and the second SIM card are different SIM cards among at least two SIM cards of the UE.

18 Claims, 6 Drawing Sheets

(51) Int. Cl.
*H04W 48/08* (2009.01)
*H04W 84/04* (2009.01)

(56) References Cited

U.S. PATENT DOCUMENTS

| | | | |
|---|---|---|---|
| 2015/0065132 A1* | 3/2015 | Ramkumar | H04W 48/16 455/435.2 |
| 2015/0264640 A1 | 9/2015 | Feng et al. | |
| 2017/0358327 A1* | 12/2017 | Oh | G11C 5/02 |
| 2018/0070303 A1 | 3/2018 | Tambaram Kailasam et al. | |
| 2019/0319868 A1* | 10/2019 | Svennebring | H04W 24/08 |
| 2020/0008069 A1* | 1/2020 | Zhu | H04W 76/16 |

FOREIGN PATENT DOCUMENTS

| | | |
|---|---|---|
| CN | 104796963 A | 7/2015 |
| CN | 104918300 A | 9/2015 |
| CN | 106413013 A | 2/2017 |
| CN | 106455010 A | 2/2017 |
| EP | 2302971 A2 | 3/2011 |
| WO | WO-2017054572 A1 * | 4/2017 ............ H04W 88/06 |

OTHER PUBLICATIONS

First Office Action of Chinese Priority Application No. 201910056818.8, dated Dec. 15, 2020. Translation provided by Bohui Intellectual Property.

Second Office Action of Chinese Priority Application No. 201910056818.8, dated May 20, 2021. Translation provided by Bohui Intellectual Property.

International Search Report and Written Opinion of the International Searching Authority regarding International Patent Application No. PCT/CN2020/071826, dated Apr. 10, 2020. Translation provided by Bohui Intellectual Property.

* cited by examiner

INFORMATION SHARING METHOD AND USER EQUIPMENT

CROSS-REFERENCE TO RELATED APPLICATIONS

This application is a Bypass Continuation Application of PCT/CN2020/071826 filed on Jan. 13, 2020, which claims priority to Chinese Patent Application No. 201910056818.8, filed on Jan. 18, 2019, which are incorporated herein by reference in their entirety.

TECHNICAL FIELD

The embodiments of the present application relate to the field of communications technologies, and in particular, to an information sharing method and a user equipment.

BACKGROUND

Generally, a multi-card user equipment (UE) may camp on many different cells. Take dual-card UE as an example. For example, one card may camp on one cell, and the other card may camp on another cell. Specifically, one way for the dual-card UE to transmit data is that the two cards may camp on different cells separately and transmit data simultaneously through the respective cells they camp on. The other way is that the two cards may camp on different cells separately and transmit data by means of time division; that is, in one period of time, one card transmits data through the cell it camps on, and in another period of time, another card transmits data through the cell it camps on.

SUMMARY

According to a first aspect of the embodiments of the present application, an information sharing method applied to UE is provided, where the UE includes at least two subscriber identity module (SIM) cards, and the information sharing method may include: obtaining first information by using a first SIM card, where the first information is information sent by a network device of a second SIM card and received by the second SIM card; and controlling the first SIM card according to the first information. The first SIM card and the second SIM card are different SIM cards among the at least two SIM cards.

According to a second aspect of the embodiments of the present application, UE is provided, where the UE includes at least two SIM cards, and the UE may include an acquisition unit and a control unit. The acquisition unit is configured to obtain first information by using a first SIM card, where the first information is information sent by a network device of a second SIM card and received by the second SIM card. The control unit is configured to control the first SIM card according to the first information obtained by the acquisition unit. The first SIM card and the second SIM card are different SIM cards among the at least two SIM cards.

According to a third aspect of the embodiments of the present application, UE is provided, where the UE includes: a processor, a memory, and a computer program stored in the memory and executable on the processor, where the computer program, when executed by the processor, implements the steps of the information sharing method according to the foregoing first aspect.

According to a fourth aspect of the embodiments of the present application, a non-transitory computer-readable storage medium is provided, where the non-transitory computer-readable storage medium stores a computer program, and the computer program, when executed by a processor, implements the steps of the information sharing method according to the first aspect.

DETAILED DESCRIPTION OF EMBODIMENTS

Figure 1:
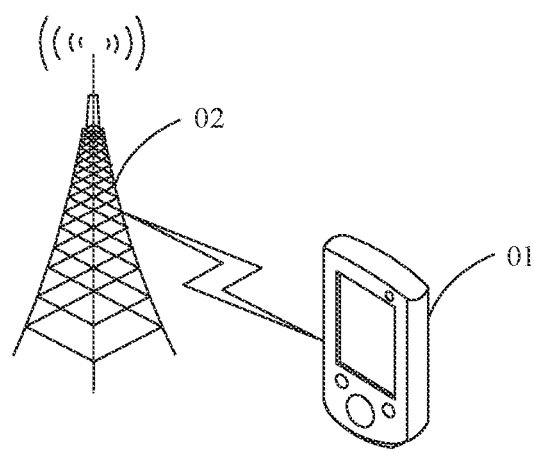
FIG. 1 is a schematic architectural diagram of a communications system according to an embodiment of the present application.

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of the embodiments of this application, the terms such as "first" and "second" are used to distinguish between different objects, but are not used to describe a particular sequence of the objects. For example, a first SIM card, a second SIM card, and the like are used to distinguish between different SIM cards, but are not used to describe a particular sequence of the SIM cards.

In the description of the embodiments of this application, unless otherwise specified, the meaning of "a plurality of" means two or more. For example, multiple elements refer to two elements or more than two elements.

The term "and/or" in this specification describes an association relationship of associated objects, indicating that three relationships may exist. For example, a display panel and/or a backlight may indicate three cases: only the display panel exists, both the display panel and the backlight exist, and only the backlight exists. A character "/" in this specification indicates an "or" relationship between associated objects. For example, input/output indicates input or output.

In the embodiments of this application, the term such as "exemplary" or "for example" is used to indicate an example, an instance, or a description. Any embodiment or design scheme described as "exemplary" or "an example" in the embodiments of this application should not be construed as being preferable or advantageous than other embodiments or design schemes. Specifically, the words such as "exemplary" or "for example" are used to present related concepts in a specific manner.

The following describes some concepts and/or terms related in an information sharing method and a user equipment provided in the embodiments of the present application.

System information (SI) may include: a master information block (MIB) and a system information block (SIB).

The foregoing MIB and SIB are always broadcast periodically. A broadcast cycle of the MIB is a fixed cycle, and a broadcast cycle of the SIB may be a different cycle configured by a network device. The SIB may include system information such as SIB1-SIB20, and it is sure that it may be subject to be continuous extension in the future, which is not limited in the embodiments of the present application.

The MIB may be dispensed together with a synchronous signal (SS) block to UE, and the MIB may include scheduling information for remaining system information (RMSI). The RMSI is some necessary system information for the UE to work in a certain cell, which is similar to, for example, SIB1 and SIB2 in a long term evolution (LTE) system, and the RMSI may include scheduling information for other SI.

The other system information (OSI): system information that supports other auxiliary functions, which is similar to, for example, an earthquake and tsunami warning system (ETWS) and commercial mobile alert service (CMAS) in an LTE system, or another system information.

The system information may include bar information of some cells. For example, the bar information of a cell may include: information used to indicate that a certain cell is barred; or, information used to indicate that a frequency of a certain cell is barred; an identifier of a closed subscriber group corresponding to a certain cell; and an identifier of a cell type corresponding to a certain cell.

The embodiments of the present application provide an information sharing method and a user equipment, where the UE may obtain first information by using a first SIM card (the first information is information sent by a network device of a second SIM card and received by the second SIM card), and control the first SIM card according to the first information. As the first SIM card can share the first information with the second SIM card (that is, the information sent by the network device of the second SIM card to the second SIM card), the UE can control the first SIM card according to the first information, so that the first SIM card accesses a cell with almost the same signal quality as that of a cell accessed by the second SIM card, or the first SIM card does not need to judge a state of some cells after the second SIM card judges the state of some cells. In this way, stability of the communications performance of the multi-card UE can be enhanced.

The information sharing method and the user equipment according to the embodiments of the present application may be applied to a communications system. For example, it may be applied to a process in which at least two SIM cards (such as the first SIM card and the second SIM card) of the multi-card UE share the first information of the second SIM card and control the first SIM card according to the first information based on the communications system.

FIG. 1 shows a schematic architectural diagram of a communications system according to an embodiment of the present application. As shown in FIG. 1, the communications system may include a UE 01 and a network device 02. The UE 01 and the network device 02 may establish a connection and communicate with each other.

It should be noted that in this embodiment of the present application, the UE 01 and the network device 02 as shown in FIG. 1 may be connected wirelessly. To show a connection relationship between the UE 01 and the network device 02 more clearly, a solid line as shown in FIG. 1 is used to show the connection relationship between the UE 01 and the network device 02.

Optionally, in the embodiment of the present application, the foregoing network device 02 may be a network device of the second SIM card or a network device of the first SIM card.

UE is a device providing voice and/or data connectivity to a user, a handheld device having a wired/wireless connection function, or other processing device connected to a wireless modem. The UE may communicate with one or more core network devices through a radio access network (RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges language and/or data with the RAN. For example, the mobile apparatus is a device such as a personal communication service (PCS) phone, a cordless phone, a session initiation protocol (SIP) phone, a wireless local loop (WLL) station, or a personal digital assistant (PDA) and so on. The UE may be alternatively referred to as a user agent or a terminal device.

The network device may be a base station. The base station is an apparatus deployed in the RAN to provide a wireless communication function for the UE. The base station may include various forms of macro base stations, micro base stations, relay stations, access points, and the like. In systems using different wireless access technologies, names of devices having base station functions may be different. For example, in a 3rd generation mobile communications (3G) network, the device is referred to as a NodeB (NodeB); in an LTE system, the device is referred to as an evolved NodeB (eNB or eNodeB); and in a 5th generation mobile communications (5G) network, the device is referred to as a gNB. With evolution of the communications technology, the name of the "base station" may change.

However, as multi-card UE camps on multiple different cells, on the one hand, the signal quality of these cells may vary, for example, the signal quality of some cells is good while the signal quality of some other cells is not so good, which results in good communications quality of a card camping on some cells and poor communications quality of a card camping on some other cells; on the other hand, some of these cells may be in a state of barring access, in this case, the multiple cards need to determine the state of multiple cells when accessing the multiple cells, which will lead to unstable communications performance of the multi-card UE.

The following describes in detail an information sharing method and a user equipment provided by the embodiments of the present application through specific embodiments and application scenarios with reference to the accompanying drawings.

Figure 2:
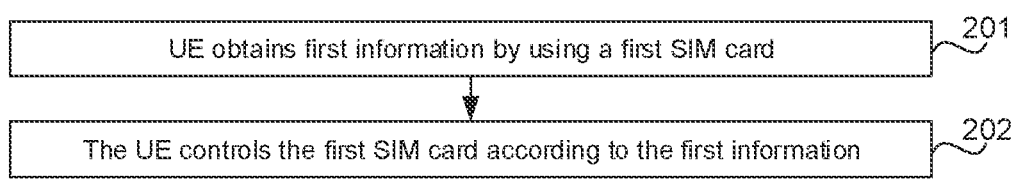
FIG. 2 is a first schematic diagram of an information sharing method according to an embodiment of the present application.

Based on a communications system as shown in FIG. 1, an embodiment of the present application provides an information sharing method. As shown in FIG. 2, the information sharing method may include the following steps 201 and 202.

Step 201: UE obtains first information by using a first SIM card.

In this embodiment of the present application, the foregoing first information is information sent by a network device of a second SIM card and received by the second SIM card.

In this embodiment of the present application, the UE may include at least two SIM cards. The first SIM card and the second SIM card are different SIM cards among the at least two SIM cards.

Optionally, in this embodiment of the present application, the foregoing first SIM card and the second SIM card belong to a same operator.

It should be noted that in this embodiment of the present application, the foregoing first SIM card may be one SIM card different from the second SIM card among the at least two SIM cards; or, the foregoing first SIM card may be another SIM card other than the second SIM card among the at least two SIM cards.

It can be understood that if the first SIM card is one SIM card different from the second SIM card among the at least two SIM cards, the one SIM card and the second SIM card share the first information; if the first SIM card is another SIM card other than the second SIM card among the at least two SIM cards, the another SIM card and the second SIM card share the first information (that is, all SIM cards among the at least two SIM cards share the first information).

Optionally, in this embodiment of the present application, a state of the foregoing second SIM card may be idle state (Idle), inactive state (Inactive), or connected state.

Optionally, in this embodiment of the present application, the foregoing second SIM card may be a primary card of the UE, and the first SIM card may be a secondary card of the UE.

Optionally, in this embodiment of the present application, the foregoing first information may include any one of the following: dedicated configuration information, system information, cell reselection information, and specific information in system information.

In this embodiment of the present application, the foregoing dedicated configuration information may be used to indicate a serving cell of the second SIM card that is in connected state, or a priority of a camping frequency of the second SIM card that is in idle state; the foregoing system information may be used to instruct the second SIM card to select a cell or to reselect a cell; the foregoing cell reselection information may be used to instruct the second SIM card to reselect a cell; and the foregoing specific information in system information may be used to indicate that at least one first cell is in a state of barring access, and a cell selected or reselected by the second SIM card is a cell in the at least one first cell.

It should be noted that a camping frequency of the second SIM card may be understood as: a frequency of a cell where the second SIM card camps on.

Alternatively, in the embodiment of the present application, the foregoing specific information in system information may include at least one of the following A, B, C, D or E.

A: barring information of the at least one first cell, where the foregoing at least one first cell is a serving cell of the second SIM card, or a cell of a first cell type in a public land mobile network (PLMN) corresponding to a network device of the second SIM card.

It should be noted that the serving cell of the foregoing second SIM card may be understood as a cell where the network device of the second SIM card provides services.

Optionally, in this embodiment of the present application, the foregoing first cell type may be a new radio (NR) cell type.

It may be understood that the barring information of the foregoing at least one first cell may be used to indicate that the serving cell of the second SIM card is in a state of barring access; or the barring information of the foregoing at least one first cell may be used to indicate that the cell of the first cell type in the PLMN corresponding to the network device of the second SIM card is in a state of barring access.

B: barring information of a first frequency, where the foregoing at least one first cell is a cell corresponding to the first frequency.

It may be understood that the foregoing first frequency is a frequency of the at least one first cell.

It may be understood that the foregoing barring information of the first frequency may be used to indicate that a cell corresponding to the first frequency is in a state of barring access.

C: an identifier of a cell type, where the foregoing at least one first cell is a cell of this cell type among serving cells of the second SIM card.

For example, if identifiers of cell types included in the foregoing specific information are type 1, type 2 and type 3 respectively, the serving cells for the second SIM card are cell 1 to cell 4 respectively, and cell types corresponding to the cell 1 to cell 4 are type 1 to type 4 respectively, the at least one first cell is cell 1 to cell 3.

It may be understood that the foregoing identifier of a cell type may be used to indicate that a cell of this cell type among serving cells of the second SIM card is in a state of barring access.

D: an identifier of a closed subscriber group (CSG), where the foregoing at least one first cells is a cell belonging to the CSG.

It may be understood that the foregoing closed subscriber group includes at least one first cell.

It may be understood that the foregoing identifier of a closed subscriber group may be used to indicate that a cell belonging to the closed subscriber group is in a state of barring access.

E: an identity of the at least one first cell, where the foregoing at least one first cell is a cell that allows another UE to access.

It may be understood that the foregoing identifier of the at least one first cell may be used to indicate that the cell that allows another UE to access is in a state of barring access.

Figure 3:
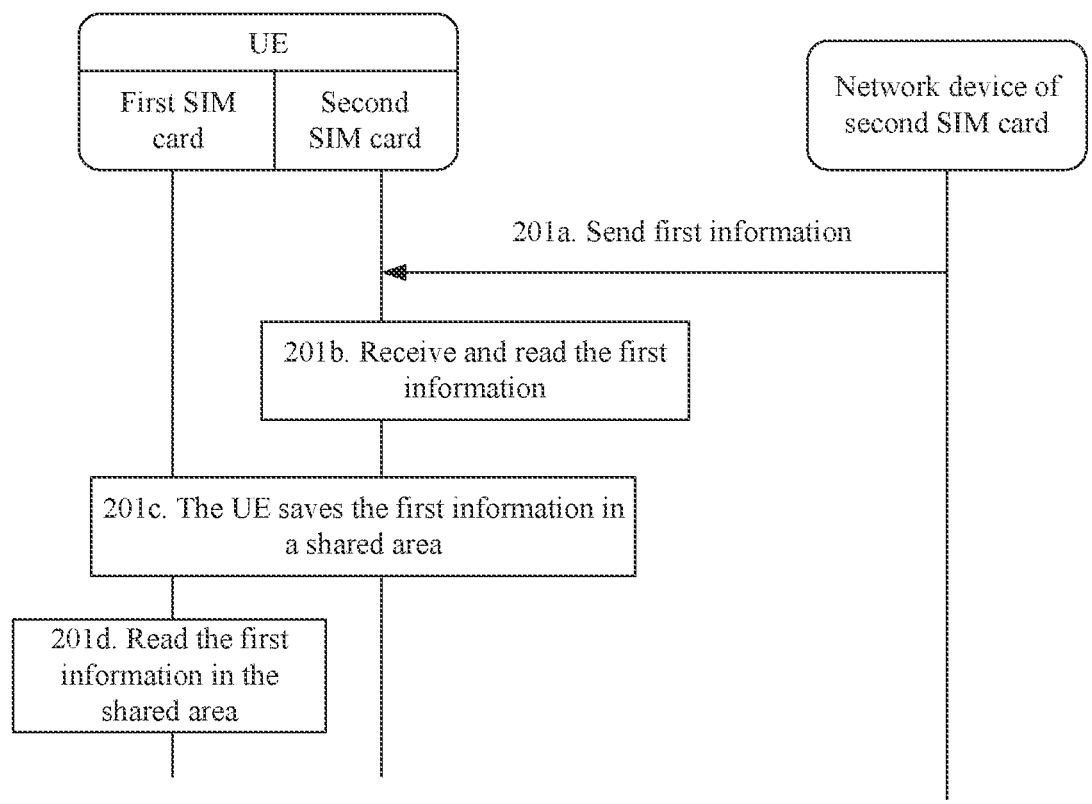
FIG. 3 is a second schematic diagram of an information sharing method according to an embodiment of the present application.

Optionally, in this embodiment of the present application, the foregoing step 201 may be implemented by using the following steps 201a to 201d, as shown in FIG. 3 in combination with FIG. 2.

Step 201a: the network device of the second SIM card sends the first information to the second SIM card of the UE.

Step 201b: the second SIM card of the UE receives the first information, and reads the first information.

Step 201c: the UE saves the first information in a shared area.

Step 201d: the first SIM card of the UE reads the first information in the shared area.

In this embodiment of the present application, the foregoing shared area is an area where the first SIM card and the second SIM card share information.

Optionally, in this embodiment of the present application, the foregoing shared area may be an area where at least two SIM cards share information.

It may be understood that after the network device of the second SIM card sends the first information to the second SIM card, the second SIM card may read the first information, and then the UE may store the first information read by the second SIM card in the shared area in the UE, so that the first SIM card can read the first information from the shared area.

Figure 4:
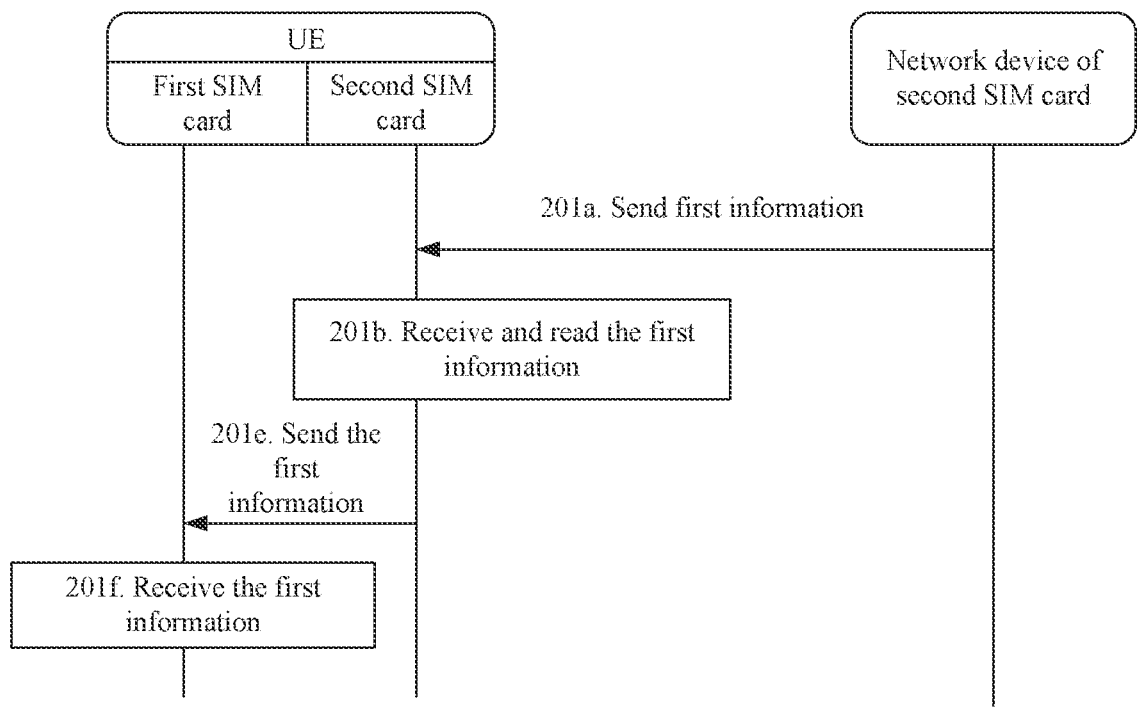
FIG. 4 is a third schematic diagram of an information sharing method according to an embodiment of the present application.

Optionally, in this embodiment of the present application, the foregoing step 201 may be implemented by using the following steps 201a, step 201b, step 201e, and step 201f, as shown in FIG. 4 in combination with FIG. 2.

Step 201a: the network device of the second SIM card sends the first information to the second SIM card of the UE.

Step 201b: the second SIM card of the UE receives the first information, and reads the first information.

Step 201e: the second SIM card of the UE sends the first information to the first SIM card of the UE.

Step 201f: the first SIM card of the UE receives the first information.

It may be understood that after the network device of the second SIM card sends the first information to the second SIM card, the second SIM card may read the first information and send the read first information to the first SIM card.

In this embodiment of the present application, the first SIM card may share the first information of the second SIM card by means of reading the first information in the shared area or by means of receiving the first information sent by the second SIM card.

Optionally, in this embodiment of the present application, the foregoing step 201 may be implemented by using the following step 201g.

Step 201g: the UE obtains the first information by using the first SIM card in the case that the first SIM card selects a cell or reselects a cell.

In this embodiment of the present application, the foregoing selecting a cell by the first SIM card may be understood as a process of selecting a cell to camp on in the case that the first SIM card has not yet camped on a cell. The foregoing reselecting a cell by the first SIM card may be understood as a process of reselecting another cell to camp on in the case that the first SIM card leaves a cell it has camped on. The first SIM card reselects a cell in the case that it is in idle state (that is, the first SIM card in idle state reselects a cell).

It should be noted that for a method for "obtaining the first information by the UE by using the first SIM card" in the foregoing step 201g, reference may be made to the relevant description from step 201a to step 201f in the foregoing embodiment, which is no longer repeated here.

Optionally, in this embodiment of the present application, the UE may also obtain the first information by using the first SIM card in the case that the first SIM card performs another action.

Step 202: The UE controls the first SIM card according to the first information.

Alternatively, in this embodiment of the present application, the UE may control the first SIM card to access one cell (such as a second cell or a third cell described in the following embodiment) or control the first SIM card not to access the at least one first cell (the at least one first cell is in a state of barring access) according to the first information.

It may be understood that the foregoing first information is information sent to the second SIM card by the network device of the second SIM card. The first SIM card may share the first information with the second SIM card, so that the UE can control the first SIM card according to the first information.

Figure 5:
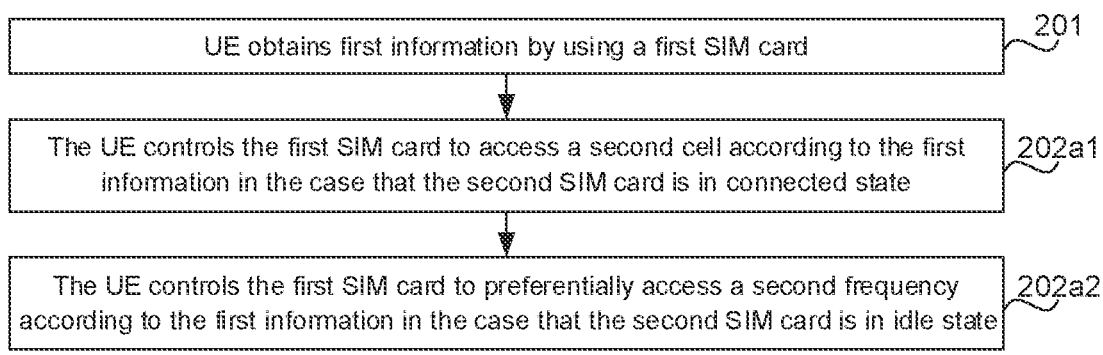
FIG. 5 is a fourth schematic diagram of an information sharing method according to an embodiment of the present application.

Optionally, in one possible implementation manner for this embodiment of the present application, the foregoing first information includes dedicated configuration information. The foregoing step 202 may be implemented by using the following step 202a1 or step 202a2, as shown in FIG. 5 in combination with FIG. 2.

Step 202a1: The UE controls the first SIM card to access a second cell according to the first information in the case that the second SIM card is in connected state.

In this embodiment of the present application, the foregoing second cell is a serving cell of the second SIM card.

It may be understood that the signal quality of the serving cell of the second SIM card is good in the case that the second SIM card is in connected state, and the UE may control the first SIM card to access the serving cell of the second SIM card with good signal quality according to dedicated configuration information (the dedicated configuration information is used to indicate the serving cell of the second SIM card that is in connected state).

Optionally, in this embodiment of the present application, the foregoing second cell may be a primary serving cell of the second SIM card.

It may be understood that in the case that the second SIM card is in connected state, the signal quality of the primary serving cell of the second SIM card is the best compared with other serving cells of the second SIM card (that is, serving cells other than the primary serving cell of the second SIM card among serving cells of the second SIM card). The UE may control the first SIM card to access the primary serving cell of the second SIM card with the best signal quality according to the dedicated configuration information.

In this embodiment of the present application, as the signal quality of the serving cell of the second SIM card is good in the case that the second SIM card is in connected state, the UE controls the first SIM card to access the second cell (that is, the serving cell of the second SIM card) according to the dedicated configuration information obtained by using the first SIM card (the dedicated configuration information is used to indicate a serving cell of the second SIM card that is in connected state). In this way, the first SIM card can access a cell with good signal quality, thereby ensuring that both the first SIM card and the second SIM card can access a cell with good signal quality, and enhancing stability of communications quality of the multi-card UE.

Step 202a2: The UE controls the first SIM card to preferentially access a second frequency according to the first information in the case that the second SIM card is in idle state.

In this embodiment of the present application, the foregoing second frequency is a frequency with the highest priority among camping frequencies of the second SIM card.

It may be understood that in the case that the second SIM card is in idle state, the UE may determine the frequency with the highest priority among the camping frequencies of the second SIM card according to dedicated configuration information (the dedicated configuration information is used to indicate priorities of the camping frequencies of the second SIM card), and then control the first SIM card to access the frequency first (that is, the second frequency).

Exemplarily, it is assumed that the camping frequencies of the second SIM card in idle state are frequency 1 to frequency 3. The UE determines that the frequency with the highest priority among the camping frequencies of the second SIM card is frequency 1 according to dedicated configuration information (for example, the dedicated configuration information is used to indicate that a priority of frequency 1 is higher than that of frequency 2, and a priority of frequency 2 is higher than that of frequency 3), and then the UE controls the first SIM card to preferentially access frequency 1 first.

In this embodiment of the present application, as the UE may control, in the case that the second SIM card is in idle state, the first SIM card to preferentially access the second frequency (that is, the frequency with the highest priority among the camping frequencies of the second SIM card) according to the dedicated configuration information which indicates the priorities of the camping frequencies of the second SIM card. In this way, the first SIM card can preferentially access the frequency with a high priority, thereby enhancing stability of the communications quality of the multi-card UE.

Figure 6:
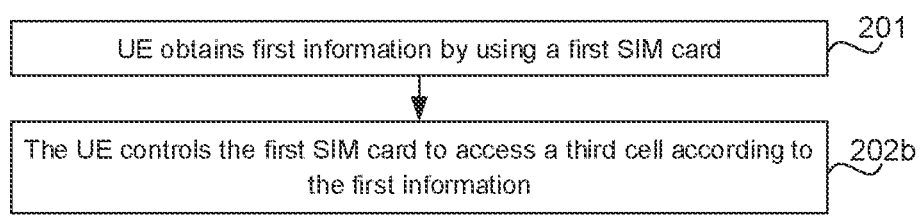
FIG. 6 is a fifth schematic diagram of an information sharing method according to an embodiment of the present application.

Optionally, in another possible implementation manner for this embodiment of the present application, the foregoing first information includes system information or cell reselection information. The foregoing step 202 may be implemented by using the following step 202b, as shown in FIG. 6 in combination with FIG. 2.

Step 202b: The UE controls the first SIM card to access a third cell according to the first information.

In this embodiment of the present application, the foregoing third cell is a cell selected or reselected by the second SIM card.

It may be understood that in the case that the first information includes system information (the system information is used to instruct the second SIM card to select or reselect a cell), the first information shared by the first SIM card is the system information that instructs the second SIM card to select or reselect a cell. In this case, the UE controls the first SIM card to directly access the third cell (that is, the cell selected or reselected by the second SIM card) rather than controls the first SIM card to perform the process of selecting or reselecting a cell.

It may be understood that in the case that the first information includes cell reselection information (the cell reselection information is used to instruct the second SIM card to reselect a cell), the first information shared by the first SIM card is the cell reselection information that instructs the second SIM card to reselect a cell. In this case, the UE controls the first SIM card to directly access the third cell (that is, the cell reselected by the second SIM card) rather than controls the first SIM card to perform the process of reselecting a cell.

It may be understood that in this embodiment of the present application, in the case that the first information includes system information or cell reselection information, the UE may control the first SIM card to access a same cell as the second SIM card (for example, the cell accessed by the second SIM card is a cell selected by the second SIM card, or a cell reselected by the second SIM card). The first SIM card and the second SIM card that access the same cell achieve almost the same communications quality.

In this embodiment of the present application, the UE may control the first SIM card to access the third cell (that is, the cell selected or reselected by the second SIM card) according to the system information (the system information is used to instruct the second SIM card to select or reselect a cell) or the cell reselection information (the cell reselection information is used to instruct the second SIM card to reselect a cell) obtained by using the first SIM card. In this way, the first SIM card can access the same cell as the second SIM card, so that the communications quality of the first SIM card and the second SIM card is the same, thereby enhancing stability of the communications quality of the multi-card UE.

Figure 7:
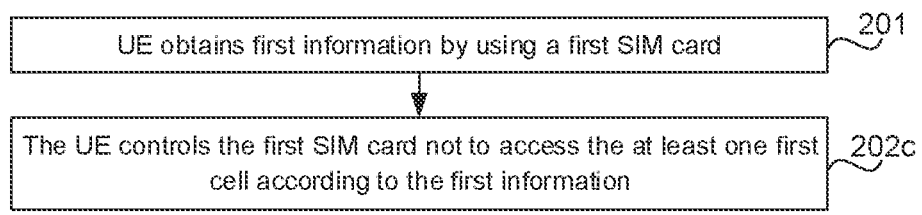
FIG. 7 is a sixth schematic diagram of an information sharing method according to an embodiment of the present application.

Optionally, in another possible implementation manner for this embodiment of the present application, the foregoing first information includes specific information in system information. The foregoing step 202 may be implemented by using the following step 202c as shown in FIG. 7 in combination with FIG. 2.

Step 202c: The UE controls the first SIM card not to access the at least one first cell according to the first information.

Optionally, in this embodiment of the present application, the at least one first cell in the foregoing step 202c may include at least one of the following: a serving cell of the second SIM card, a cell corresponding to a first frequency, a cell of a cell type among serving cells of the second SIM card, a cell belonging to a closed subscriber group, or a cell that allows another UE to access.

It may be understood that in the case that the first information includes the specific information in system information (the specific information is used to indicate that the at least one first cell is in a state of barring access), the first SIM card and the second SIM card share the specific information that indicates the at least one first cell is in a state of barring access, that is, the first SIM card can learn that the at least one first cell is in a state of barring access. In this case, the UE may control the first SIM card not to access the at least one first cell.

In this embodiment of the present application, as the specific information in system information is used to indicate that the at least one first cell is in a state of barring access, the UE controls the first SIM card not to access the at least one first cell according to the specific information obtained by using the first SIM card, which can prevent the first SIM card from performing the process of selecting or reselecting a cell in the at least one first cell (for example, judging a state of the at least one first cell) in the case of not knowing that the at least one first cell is in a state of barring access. In this way, the waste of a communications resource can be avoided, and stability of the communication performance of the multi-card UE can be enhanced.

This embodiment of the present application provides an information sharing method, where UE may obtain first information by using a first SIM card (the first information is information sent by a network device of a second SIM card and received by the second SIM card), and control the first SIM card according to the first information. As the first SIM card can share the first information with the second SIM card (that is, the information sent by the network device of the second SIM card to the second SIM card), the UE can control the first SIM card according to the first information, so that the first SIM card accesses a cell with almost the same signal quality as that of a cell accessed by the second SIM card, or the first SIM card does not need to judge a state of some cells after the second SIM card judges the state of some cells. In this way, stability of the communications performance of the multi-card UE can be enhanced.

Figure 8:
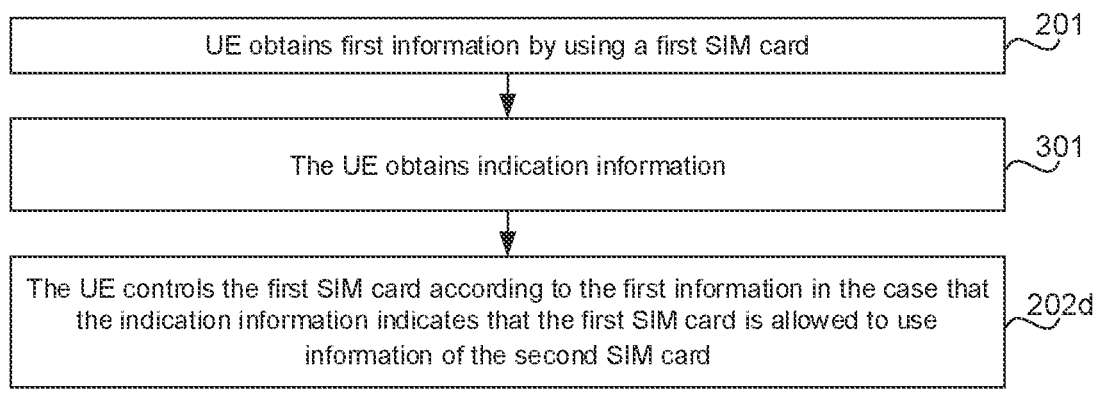
FIG. 8 is a seventh schematic diagram of an information sharing method according to an embodiment of the present application.

Optionally, in this embodiment of the present invention, before the foregoing Step 202, the information sharing method provided in this embodiment of the present invention may further include the following Step 301, and the foregoing Step 202 may be specifically implemented by using the following Step 202d as shown in FIG. 8 in combination with FIG. 2.

Step 301: The UE obtains indication information.

In this embodiment of the present invention, the foregoing indication information is used to indicate whether the first SIM card is allowed to use information of the second SIM card.

Optionally, in this embodiment of the present invention, the foregoing indication information may be used to indicate whether the first SIM card is allowed to access a serving cell of the second SIM card that is in connected state.

Optionally, in this embodiment of the present application, the foregoing indication information may be used to indicate whether the first SIM card is allowed to access a cell selected by the second SIM card.

Optionally, in this embodiment of the present application, the foregoing indication information may be used to indicate whether the first SIM card is allowed to access a cell reselected by the second SIM card.

Optionally, in this embodiment of the present application, the foregoing indication information may be used to indicate whether the first SIM card is allowed to use specific information in system information.

Optionally, in this embodiment of the present application, the foregoing indication information may be predefined, or configured by a network device.

Optionally, in this embodiment of the present application, the foregoing indication information may be predefined by a subscriber.

Step 202d: The UE controls the first SIM card according to the first information in the case that the indication information indicates that the first SIM card is allowed to use information of the second SIM card.

It should be noted that for a method for "controlling the first SIM card by the UE according to the first information" in the foregoing step 202d, reference may be made to the relevant description of step 202, step 202a1, step 202a2, step 202b and step 202c in the foregoing embodiment, which is no longer repeated here.

In this embodiment of the present application, in the case that the indication information indicates that the first SIM card is allowed to use information of the second SIM card, the UE may control the first SIM card according to the first information, so that the first SIM card accesses a cell with almost the same signal quality as that of a cell accessed by the second SIM card, or the first SIM card does not need to judge a state of some cells after the second SIM card judges the state of some cells. In this way, stability of the communications performance of the multi-card UE can be enhanced.

It should be noted that in this embodiment of the present application, the foregoing FIGS. 3 to 8 are illustrated in combination with FIG. 2, which does not form any limitation on the embodiments of the present application. It may be understood that in an actual implementation, the foregoing FIGS. 3 to 8 may also be implemented in combination with any other figures that can be combined.

Figure 9:
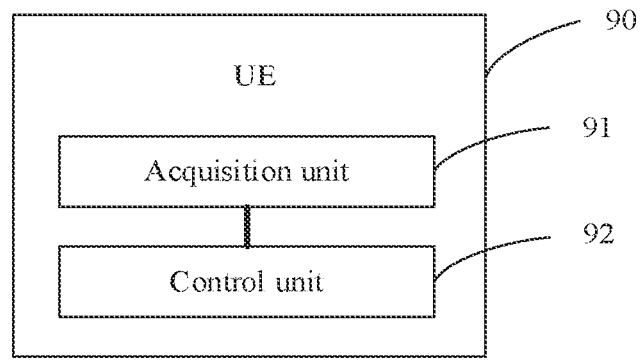
FIG. 9 is a schematic structural diagram of UE according to an embodiment of the present application.

FIG. 9 shows a possible schematic structural diagram of UE related in an embodiment of the present application, where the UE includes at least two SIM cards. As shown in FIG. 9, UE 90 provided by an embodiment of the present application may include: an acquisition unit 91 and a control unit 92.

The acquisition unit 91 is configured to obtain first information by using a first SIM card, where the first information is information sent by a network device of a second SIM card and received by the second SIM card. The control unit 92 is configured to control the first SIM card according to the first information obtained by using the acquisition unit 91. The first SIM card and the second SIM card are different SIM cards among the at least two SIM cards.

In a possible implementation manner, the foregoing first information may include any one of the following: dedicated configuration information, system information, cell reselection information, and specific information in system information. The dedicated configuration information is used to indicate a serving cell of the second SIM card that is in connected state, or a priority of a camping frequency of the second SIM card that is in idle state; the system information is used to instruct the second SIM card to select a cell or to reselect a cell; the cell reselection information is used to instruct the second SIM card to reselect a cell; the specific information in system information is used to indicate that at least one first cell is in a state of barring access, and a cell selected or reselected by the second SIM card is a cell in the at least one first cell.

In a possible implementation manner, the foregoing specific information may include at least one of the following A, B, C, D or E. A: barring information of the at least one first cell, where the at least one first cell is a serving cell of the second SIM card, or a cell of a first cell type in a PLMN corresponding to a network device for the second SIM card. B: barring information of a first frequency, where the foregoing at least one first cell is a cell corresponding to the first frequency. C: an identifier of a cell type, where the foregoing at least one first cell is a cell of this cell type among serving cells of the second SIM card. D: an identifier of a closed subscriber group, where the foregoing at least one first cell is a cell belonging to the closed subscriber group. E: an identity of the at least one first cell, where the foregoing at least one first cell is a cell that allows another UE to access.

In a possible implementation manner, the acquisition unit 91 is configured to read first information in a shared area by using the first SIM card, and the shared area is an area where the first SIM card and the second SIM card share information; or to receive the first information sent by the second SIM card by using the first SIM card.

In a possible implementation manner, the acquisition unit 91 is specifically configured to obtain the first information by using the first SIM card in the case that the first SIM card selects or reselects a cell.

In a possible implementation manner, the foregoing first SIM card and the second SIM card belong to a same operator.

In a possible implementation manner, the foregoing first information includes dedicated configuration information. The control unit 92 is configured to control the first SIM card to access a second cell in the case that the second SIM card is in connected state, where the second cell is a serving cell of the second SIM card; or to control the first SIM card to preferentially access a second frequency in the case that the second SIM card is in idle state, where the second frequency is a frequency with the highest priority among camping frequencies of the second SIM card.

In a possible implementation manner, the foregoing second cell may be a primary serving cell of the second SIM card.

In a possible implementation manner, the foregoing first information includes system information or cell reselection information. The control unit 92 is configured to control the first SIM card to access a third cell, where the third cell is a cell selected or reselected by the second SIM card.

In a possible implementation manner, the foregoing first information includes specific information. The control unit 92 is configured to control the first SIM card not to access the at least one first cell.

In a possible implementation manner, the acquisition unit 91 is further configured to obtain indication information before the control unit 92 controls the first SIM card according to the first information, where the indication information is used to indicate whether the first SIM card is allowed to use information of the second SIM card. The control unit 92 is configured to control the first SIM card according to the first information obtained by the acquisition unit in the case that the indication information obtained by the acquisition unit 91 indicates that the first SIM card is allowed to use information of the second SIM card.

In a possible implementation manner, the foregoing indication information may be predefined, or configured by a network device.

The UE provided in an embodiment of the present application can implement the processes implemented by the UE in the foregoing method embodiments. To avoid repetition, details are not described herein again.

This embodiment of the present application provides UE, where the UE may obtain first information by using a first SIM card (the first information is information sent by a network device of a second SIM card and received by the second SIM card), and control the first SIM card according to the first information. As the first SIM card can share the first information with the second SIM card (that is, the information sent by the network device of the second SIM card to the second SIM card), the UE can control the first SIM card according to the first information, so that the first SIM card accesses a cell with almost the same signal quality as that of a cell accessed by the second SIM card, or, the first SIM card does not need to judge a state of some cells after the second SIM card judges the state of some cells. In this way, stability of the communications performance of the multi-card UE can be enhanced.

Figure 10:
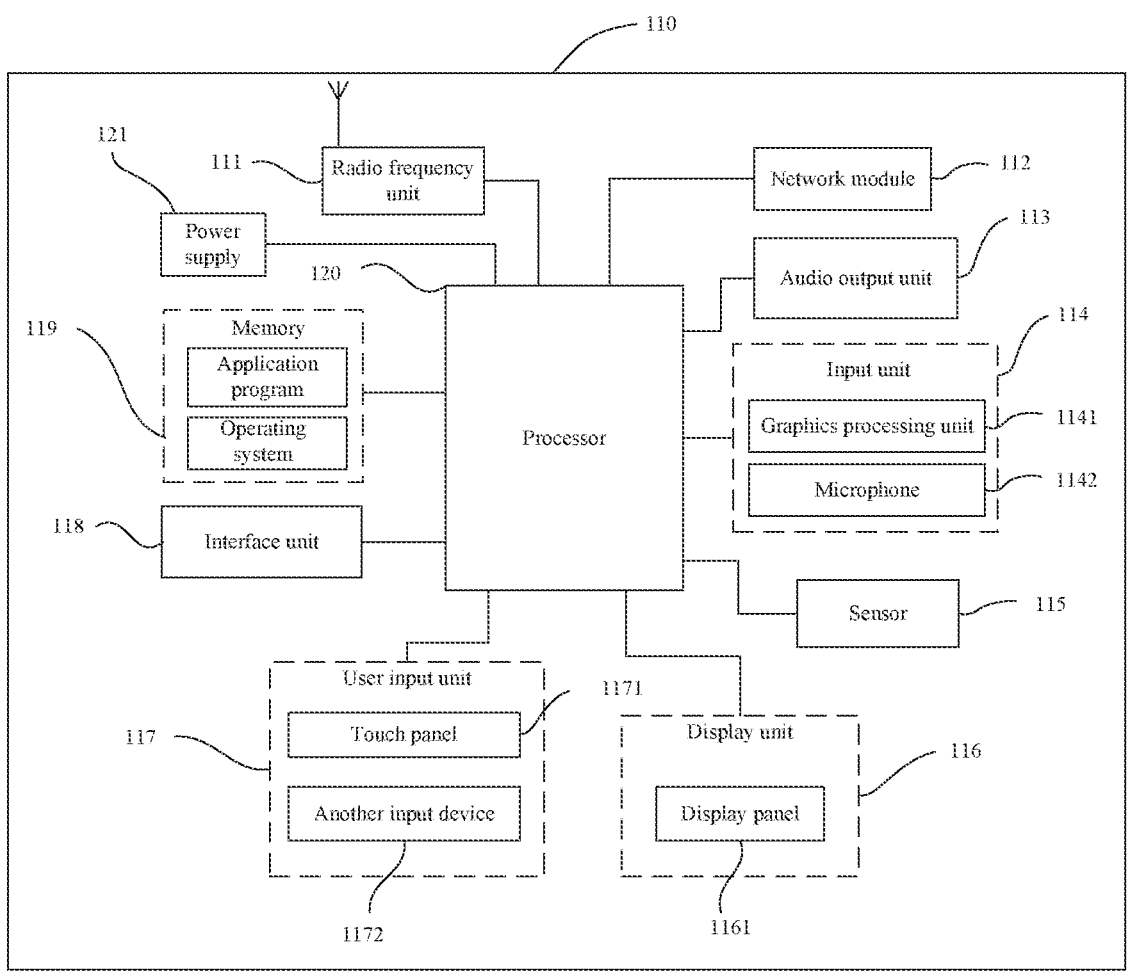
FIG. 10 is a schematic diagram of hardware of UE according to an embodiment of the present application.

FIG. 10 is a schematic diagram of hardware of UE according to an embodiment of the present application. As shown in FIG. 10, the UE 110 includes but is not limited to: a radio frequency unit 111, a network module 112, an audio output unit 113, an input unit 114, a sensor 115, a display unit 116, a user input unit 117, an interface unit 118, a memory 119, a processor 120, a power supply 121, and other components.

It should be noted that a person skilled in the art may understand that the structure of the UE shown in FIG. 10 does not constitute a limitation to the UE. The UE may include more or fewer components than those shown in FIG. 10, or a combination of some components, or an arrangement of different components. For example, in this embodiment of the present application, the UE includes but is not limited to a mobile phone, a tablet computer, a notebook computer, a palmtop computer, a vehicle-mounted terminal, a wearable device, and a pedometer.

In this embodiment of the present application, the UE 110 may include at least two SIM cards.

The processor 120 may be configured to obtain first information by using a first SIM card, where the first information is information sent by a network device of a second SIM card and received by the second SIM card; and control the first SIM card according to the first information. The first SIM card and the second SIM card are different SIM cards among the at least two SIM cards.

This embodiment of the present application provides UE, where the UE may obtain first information by using a first SIM card (the first information is information of a second SIM card sent by a network device and received by the second SIM card), and control the first SIM card according to the first information. As the first SIM card can share the first information with the second SIM card (that is, the information of the second SIM card sent by the network device to the second SIM card), the UE can control the first SIM card according to the first information, so that the first SIM card accesses a cell with almost the same signal quality as that of a cell accessed by the second SIM card, or, the first SIM card does not need to judge a state of some cells after the second SIM card judges the state of some cells. In this way, stability of the communications performance of the multi-card UE can be enhanced.

It should be understood that, in this embodiment of this application, the radio frequency unit 111 may be configured to receive and transmit information, or receive and transmit signals during a call. For example, the radio frequency unit 111 receives downlink data from a base station, and transmits the downlink data to the processor 120 for processing; and in addition, transmits uplink data to the base station. Generally, the radio frequency unit 111 includes, but is not limited to, an antenna, at least one amplifier, a transceiver, a coupler, a low noise amplifier, a duplexer, and the like. In addition, the radio frequency unit 111 may also communicate with another device through a wireless communications system and network.

UE provides a user with wireless broadband Internet access through the network module 112, for example, helps the user send and receive emails, browse web pages, and access streaming media.

The audio output unit 113 may convert audio data received by the radio frequency unit 111 or the network module 112 or stored in the memory 119 into an audio signal, and output the audio signal into sound. In addition, the audio output unit 113 may also provide audio output related to a specific function performed by the UE 110 (for example, call signal receiving sound or message receiving sound). The audio output unit 113 includes a speaker, a buzzer, a receiver, and the like.

The input unit 114 is configured to receive audio or video signals. The input unit 114 may include a graphics processing unit (GPU) 1141 and a microphone 1142. The graphics processing unit 1141 is configured to process image data of a still picture or a video obtained by an image capture apparatus (for example, a camera) in video capture mode or image capture mode. A processed image frame can be displayed on the display unit 116. An image frame processed by the graphics processing unit 1141 may be stored in the memory 119 (or another storage medium) or sent by the radio frequency unit 111 or the network module 112. The microphone 1142 may receive a sound and can process such sound into audio data. Processed audio data may be converted, in telephone call mode, into a format that can be sent to a mobile communication base station via the radio frequency unit 111 for output.

The UE 110 further includes at least one sensor 115, for example, a light sensor, a motion sensor, and other sensors. The light sensor includes an ambient light sensor and a proximity sensor, where the ambient light sensor may adjust brightness of a display panel 1161 based on brightness of ambient light, and the proximity sensor may turn off the display panel 1161 and/or backlight when the UE 110 is moved towards an ear. As a motion sensor, an accelerometer sensor may detect magnitude of acceleration in various directions (usually three axes), may detect magnitude and the direction of gravity when stationary, may be configured to identify UE postures (such as horizontal and vertical screen switch, related games, and magnetometer posture calibration), may perform functions related to vibration identification (such as a pedometer and a knock), and the like. The sensor 115 may further include a fingerprint sensor, a pressure sensor, an iris sensor, a molecular sensor, a gyroscope, a barometer, a hygrometer, a thermometer, an infrared sensor, or the like. Details are not described herein.

The display unit 116 is configured to display information input by the user or information provided to the user. The display unit 116 may include the display panel 1161, and the display panel 1161 may be configured in a form of a liquid crystal display (LCD), an organic light-emitting diode (OLED), or the like.

The user input unit 117 may be configured to receive input numeric or character information, and generate key signal inputs related to user settings and function control of the UE. The user input unit 117 includes a touch panel 1171 and another input device 1172. The touch panel 1171, also called a touch screen, may collect a touch operation of the user on or near the touch panel 1171 (For example, the user uses any suitable object or accessory such as a finger or a stylus to operate on or near the touch panel 1171). The touch panel 1171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 120, receives a command sent by the processor 120, and executes the command. In addition, the touch panel 1171 may be implemented by using a plurality of types such as a resistive type, a capacitive type, an infrared ray, and a surface acoustic wave. In addition to the touch panel 1171, the user input unit 117 may also include another input device 1172. The another input device 1172 may include, but is not limited to, a physical keyboard, functional keys (for example, a volume control key and a switch key), a trackball, a mouse, and a joystick. Details are not described herein again.

Optionally, the touch panel 1171 may cover the display panel 1161. When detecting a touch operation on or near the touch panel 1171, the touch panel 1171 transmits the touch operation to the processor 120 to determine a type of a touch event. Then the processor 120 provides corresponding visual output on the display panel 1161 based on the type of the touch event. Although in FIG. 10, the touch panel 1171 and the display panel 1161 are configured as two independent components to implement input and output functions of the UE, in some embodiments, the touch panel 1171 and the display panel 1161 may be integrated to implement the input and output functions of the UE. Details are not limited herein.

The interface unit 118 is an interface for connecting an external apparatus to the UE 110. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 118 may be configured to receive input (for example, data information and power) from the external apparatus and transmit the received input to one or more elements in the UE 110, or may be configured to transmit data between the UE 110 and the external apparatus.

The memory 119 may be configured to store a software program and various data. The memory 119 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 119 may include a high-speed random access memory or a nonvolatile memory, for example, at least one magnetic disk storage device, a flash memory, or another volatile solid-state storage device.

The processor 120 is a control center of the UE, connects various parts of the entire UE by using various interfaces and circuits, and performs various functions of the UE and processes data by running or executing software programs and/or modules stored in the memory 119 and invoking data stored in the memory 119, so as to monitor the UE as a whole. The processor 120 may include one or more processing units. Optionally, the processor 120 may integrate an application processor with a modem processor. The application processor mainly processes the operating system, a user interface, the application program, and the like, and the modem processor mainly processes wireless communication. It can be understood that the above-mentioned modem processor may not be integrated in the processor 120.

The UE 110 may further include the power supply 121 (for example, a battery) configured to supply power to various components. Optionally, the power supply 121 may be logically connected to the processor 120 by using a power management system, to implement functions such as managing charging, discharging, and power consumption by using the power management system.

In addition, the UE 110 includes some function modules not shown. Details are not described herein.

Optionally, an embodiment of the present application further provides UE, including the processor 120 and the memory 119 that are shown in FIG. 10, and a computer program stored in the memory 119 and executable on the processor 120, where the computer program, when executed by the processor 120, implements the processes of the foregoing method embodiments, and the same technical effects can be achieved. To avoid repetition, details are not described herein again.

An embodiment of the present application further provides a non-transitory computer-readable storage medium, where the non-transitory computer-readable storage medium stores a computer program, where the computer program, when executed by the processor 120 shown in FIG. 10, implements the processes of the foregoing method embodiments, and the same technical effects can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . .

" does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

What is claimed is:

1. An information sharing method, applied to a user equipment (UE), wherein the UE comprises at least two subscriber identity module (SIM) cards, and the method comprises:
    obtaining first information by using a first SIM card, wherein the first information is information sent by a network device of a second SIM card and received by the second SIM card; and
    controlling the first SIM card according to the first information, and controlling the first SIM card to access a corresponding cell according to the first information;
    wherein the first SIM card and the second SIM card are different SIM cards among the at least two SIM cards;
    wherein the first information comprises any one of following: dedicated configuration information, system information, cell reselection information, and specific information in system information;
    wherein: the dedicated configuration information is used to indicate a serving cell of the second SIM card that is in a connected state, or a priority of a camping frequency of the second SIM card that is in an idle state; the system information is used to instruct the second SIM card to select a cell or to reselect a cell; the cell reselection information is used to instruct the second SIM card to reselect a cell; the specific information in system information is used to indicate that at least one first cell is in a state of barring access, and a cell selected or reselected by the second SIM card is a cell in the at least one first cell.

2. The method according to claim 1, wherein the specific information comprises at least one of A, B, C, D, or E:
    A: barring information of the at least one first cell, wherein the at least one first cell is a serving cell of the second SIM card, or a cell of a first cell type in a public land mobile network (PLMN) corresponding to a network device of the second SIM card;
    B: barring information of a first frequency, wherein the at least one first cell is a cell corresponding to the first frequency;
    C: an identifier of a cell type, wherein the at least one first cell is a cell of the cell type among serving cells of the second SIM card;
    D: an identifier of a closed subscriber group, wherein the at least one first cell is a cell belonging to the closed subscriber group; and
    E: an identity of the at least one first cell, wherein the at least one first cell is a cell that allows another UE to access.

3. The method according to claim 1, wherein the obtaining first information by using the first SIM card comprises:
    reading first information in a shared area by using the first SIM card, wherein the shared area is an area wherein the first SIM card and the second SIM card share information;
    or
    receiving the first information sent by the second SIM card by using the first SIM card.

4. The method according to claim 1, wherein the obtaining first information by using the first SIM card comprises:
    obtaining the first information by using the first SIM card in the case that the first SIM card selects a cell or reselects a cell.

5. The method according to claim 1, wherein the first SIM card and the second SIM card belong to a same operator.

6. The method according to claim 1, wherein the first information comprises the dedicated configuration information; and
    the controlling the first SIM card comprises:
    controlling the first SIM card to access a second cell in the case that the second SIM card is in connected state, wherein the second cell is a serving cell of the second SIM card;
    or
    controlling the first SIM card to preferentially access a second frequency in the case that the second SIM card is in idle state, wherein the second frequency is a frequency with the highest priority among camping frequencies of the second SIM card.

7. The method according to claim 6, wherein the second cell is a primary serving cell of the second SIM card.

8. The method according to claim 1, wherein the first information comprises the system information or the cell reselection information;
    the controlling the first SIM card comprises:
    controlling the first SIM card to access a third cell, wherein the third cell is a cell selected or reselected by the second SIM card.

9. The method according to claim 1, wherein the first information comprises the specific information;
    the controlling the first SIM card comprises:
    controlling the first SIM card not to access the at least one first cell.

10. The method according to claim 1, wherein before the controlling the first SIM card according to the first information, the method further comprises:
    obtaining indication information, wherein the indication information is used to indicate whether the first SIM card is allowed to use information of the second SIM card;
    the controlling the first SIM card according to the first information comprises:
    controlling the first SIM card according to the first information in the case that the indication information indicates that the first SIM card is allowed to use information of the second SIM card.

11. The method according to claim 10, wherein the indication information is predefined, or configured by a network device.

12. A user equipment (UE), comprising: a processor, a memory, and a computer program stored in the memory and executable on the processor, wherein the UE comprises at least two subscriber identity module (SIM) cards, and the computer program, when executed by the processor, causes the processor to perform:
  obtaining first information by using a first SIM card, wherein the first information is information sent by a network device of a second SIM card and received by the second SIM card; and
  controlling the first SIM card according to the first information, and controlling the first SIM card to access a corresponding cell according to the first information;
  wherein the first SIM card and the second SIM card are different SIM cards among the at least two SIM cards;
  wherein the first information comprises any one of following: dedicated configuration information, system information, cell reselection information, and specific information in system information;
  wherein: the dedicated configuration information is used to indicate a serving cell of the second SIM card that is in a connected state, or a priority of a camping frequency of the second SIM card that is in an idle state; the system information is used to instruct the second SIM card to select a cell or to reselect a cell; the cell reselection information is used to instruct the second SIM card to reselect a cell, the specific information in system information is used to indicate that at least one first cell is in a state of barring access, and a cell selected or reselected by the second SIM card is a cell in the at least one first cell.

13. The UE according to claim 12, wherein the computer program, when executed by the processor, causes the processor to perform:
  reading first information in a shared area by using the first SIM card, wherein the shared area is an area wherein the first SIM card and the second SIM card share information;
  or
  receiving the first information sent by the second SIM card by using the first SIM card.

14. The UE according to claim 12, wherein the computer program, when executed by the processor, causes the processor to perform:
  obtaining the first information by using the first SIM card in the case that the first SIM card selects a cell or reselects a cell.

15. The UE according to claim 12, wherein the first information comprises the dedicated configuration information; and
  the computer program, when executed by the processor, causes the processor to perform:
  controlling the first SIM card to access a second cell in the case that the second SIM card is in connected state, wherein the second cell is a serving cell of the second SIM card;
  or
  controlling the first SIM card to preferentially access a second frequency in the case that the second SIM card is in idle state, wherein the second frequency is a frequency with the highest priority among camping frequencies of the second SIM card.

16. The UE according to claim 12, wherein the first information comprises the system information or the cell reselection information;
  the computer program, when executed by the processor, causes the processor to perform:
  controlling the first SIM card to access a third cell, wherein the third cell is a cell selected or reselected by the second SIM card;
  or
  the first information comprises the specific information;
  the computer program, when executed by the processor, causes the processor to perform:
  controlling the first SIM card not to access the at least one first cell.

17. The UE according to claim 12, wherein the computer program, when executed by the processor, causes the processor to further perform:
  obtaining indication information, wherein the indication information is used to indicate whether the first SIM card is allowed to use information of the second SIM card;
  the computer program, when executed by the processor, causes the processor to perform:
  controlling the first SIM card according to the first information in the case that the indication information indicates that the first SIM card is allowed to use information of the second SIM card.

18. A non-transitory computer-readable storage medium, wherein the non-transitory computer-readable storage medium stores a computer program, and the computer program, when executed by a processor, causes the processor to perform:
  obtaining first information by using a first subscriber identity module (SIM) card, wherein the first information is information sent by a network device of a second SIM card and received by the second SIM card; and
  controlling the first SIM card according to the first information, and controlling the first SIM card to access a corresponding cell according to the first information;
  wherein the first SIM card and the second SIM card are different SIM cards among the at least two SIM cards;
  the first information comprises any one of following: dedicated configuration information, system information, cell reselection information, and specific information in system information;
  wherein: the dedicated configuration information is used to indicate a serving cell of the second SIM card that is in a connected state, or a priority of a camping frequency of the second SIM card that is in an idle state; the system information is used to instruct the second SIM card to select a cell or to reselect a cell; the cell reselection information is used to instruct the second SIM card to reselect a cell; the specific information in system information is used to indicate that at least one first cell is in a state of barring access, and a cell selected or reselected by the second SIM card is a cell in the at least one first cell.

* * * * *